US012598619B2

(12) United States Patent
Sakhnini et al.

(10) Patent No.: US 12,598,619 B2
(45) Date of Patent: Apr. 7, 2026

(54) PAUSING AND RESUMING SKIPPING OF CONTROL CHANNEL MONITORING

(71) Applicant: QUALCOMM Incorporated, San Diego, CA (US)

(72) Inventors: Iyab Issam Sakhnini, San Diego, CA (US); Huilin Xu, Temecula, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/362,623

(22) Filed: Jul. 31, 2023

(65) Prior Publication Data

US 2025/0048373 A1 Feb. 6, 2025

(51) Int. Cl.
| | |
|---|---|
| *H04W 72/23* | (2023.01) |
| *H04L 1/1829* | (2023.01) |
| *H04W 72/0446* | (2023.01) |

(52) U.S. Cl.
CPC .......... *H04W 72/23* (2023.01); *H04L 1/1854* (2013.01); *H04W 72/0446* (2013.01)

(58) Field of Classification Search
CPC .......... H04W 72/232; H04W 72/0446; H04W 72/04; H04W 72/23; H04W 72/044; H04L 1/1854; H04L 1/1829; H04L 5/0094; H04L 5/005
See application file for complete search history.

(56) References Cited

U.S. PATENT DOCUMENTS

| | | | | |
|---|---|---|---|---|
| 2013/0294318 A1* | 11/2013 | Amerga | .................. | H04W 4/06 370/312 |
| 2018/0279327 A1 | 9/2018 | Ying et al. | | |
| 2024/0155643 A1* | 5/2024 | Khoshkholgh Dashtaki | ............... | H04L 1/1822 |
| 2025/0176067 A1* | 5/2025 | Khoshkholgh Dashtaki | ............... | H04W 76/28 |

* cited by examiner

Primary Examiner — Wei Zhao
(74) Attorney, Agent, or Firm — Holland & Hart LLP

(57) ABSTRACT

Methods, systems, and devices for wireless communication are described. A first wireless communication device may receive, from a second wireless communication device, a first control message scheduling transmission of a message and indicating to skip monitoring of one or more control channel occasions during a time period. The first wireless communication device may transmit a feedback message indicating that the message was not successfully received and indicating resuming of monitoring of at least one control channel occasion of the one or more control channel occasions during the time period. The first wireless communication device may monitor, within the time period, a first control channel occasion of the at least one control channel occasion for a second control message scheduling retransmission of the message, and may skip monitoring of a remaining one or more control channel occasions within the time period subsequent to the first control channel occasion.

30 Claims, 10 Drawing Sheets

130

105

115

Network
Entity

Transceiver

810

Antenna

815

Communications
Manager

820

Memory

Code

830

825

840

Processor

835

805

800

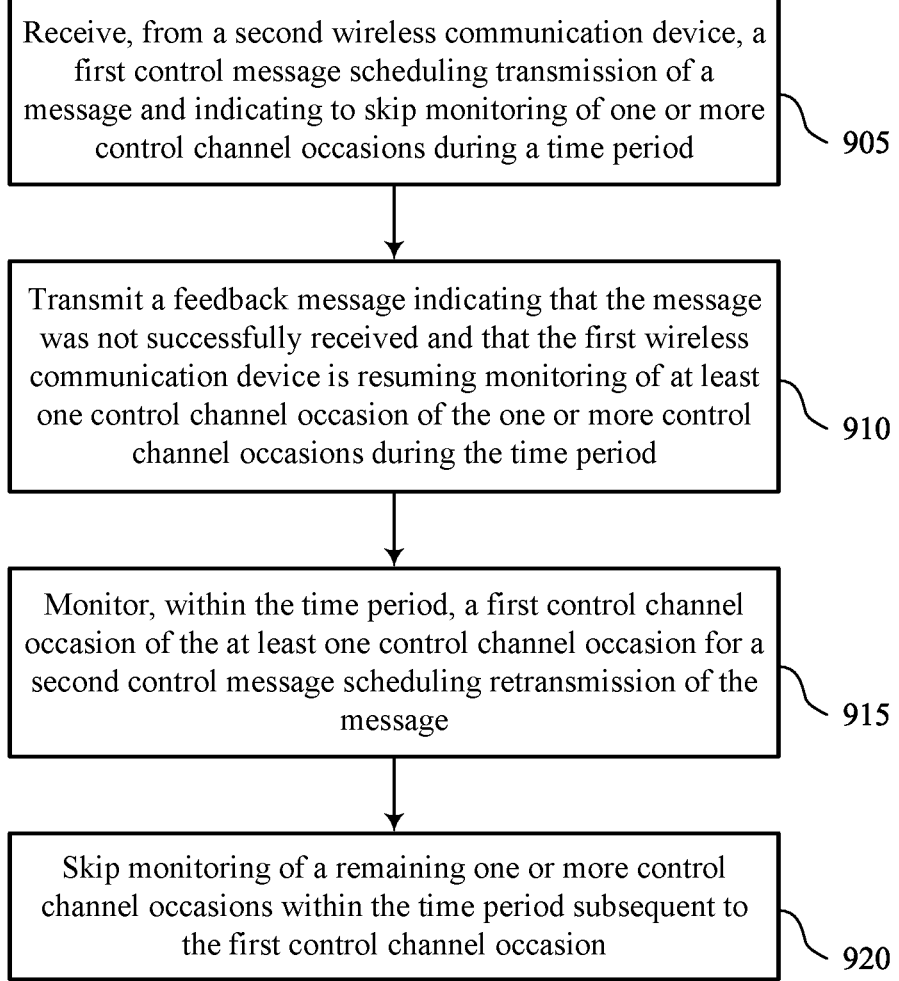

Receive, from a second wireless communication device, a first control message scheduling transmission of a message and indicating to skip monitoring of one or more control channel occasions during a time period

905

Transmit a feedback message indicating that the message was not successfully received and that the first wireless communication device is resuming monitoring of at least one control channel occasion of the one or more control channel occasions during the time period

910

Monitor, within the time period, a first control channel occasion of the at least one control channel occasion for a second control message scheduling retransmission of the message

915

Skip monitoring of a remaining one or more control channel occasions within the time period subsequent to the first control channel occasion

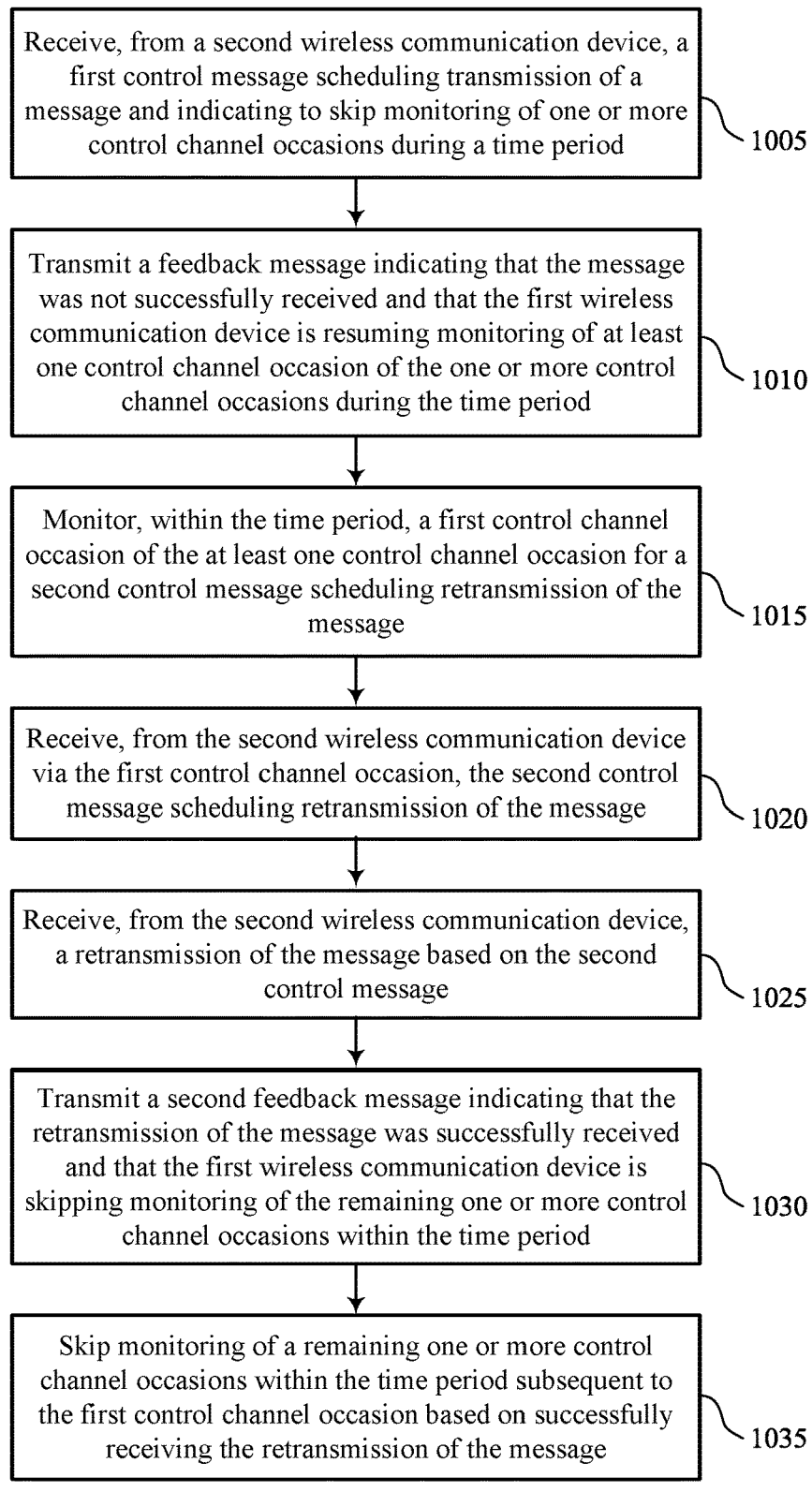

Receive, from a second wireless communication device, a first control message scheduling transmission of a message and indicating to skip monitoring of one or more control channel occasions during a time period

1005

Transmit a feedback message indicating that the message was not successfully received and that the first wireless communication device is resuming monitoring of at least one control channel occasion of the one or more control channel occasions during the time period

1010

Monitor, within the time period, a first control channel occasion of the at least one control channel occasion for a second control message scheduling retransmission of the message

1015

Receive, from the second wireless communication device via the first control channel occasion, the second control message scheduling retransmission of the message

1020

Receive, from the second wireless communication device, a retransmission of the message based on the second control message

1025

Transmit a second feedback message indicating that the retransmission of the message was successfully received and that the first wireless communication device is skipping monitoring of the remaining one or more control channel occasions within the time period

1030

Skip monitoring of a remaining one or more control channel occasions within the time period subsequent to the first control channel occasion based on successfully receiving the retransmission of the message

PAUSING AND RESUMING SKIPPING OF CONTROL CHANNEL MONITORING

FIELD OF TECHNOLOGY

The following relates to wireless communication, including pausing and resuming skipping of control channel monitoring.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support pausing and resuming skipping of control channel monitoring. For example, the described techniques provide for a wireless communication device, such as an extended reality (XR) user equipment (UE) or other device, to pause and resume control channel (e.g., physical downlink control channel (PDCCH)) monitoring in XR applications. For example, a wireless communication device may receive a control message (e.g., a downlink control information (DCI) message, a grant, etc.) scheduling transmission of another message such as an XR data packet. The control message may also indicate to skip monitoring of control channel occasions within a time period. Based on a failure in receiving or decoding the scheduled message, the wireless communication device may transmit a feedback message (e.g., a negative acknowledgement (NACK) message of a hybrid automatic repeat request (HARQ) process) indicating that the scheduled message was unsuccessfully received or decoded and that the device is resuming control channel monitoring. The wireless communication device may pause skipping (e.g., temporarily resume control channel monitoring) and may monitor at least one control channel occasion for another control message scheduling a retransmission of the scheduled message. The wireless communication device may continue to skip monitoring of a remaining one or more control channel occasions subsequent to the at least one control channel occasion.

A method for wireless communication by a first wireless communication device is described. The method may include receiving, from a second wireless communication device, a first control message scheduling transmission of a message and indicating to skip monitoring of one or more control channel occasions during a time period, transmitting a feedback message indicating that the message was not successfully received and that the first wireless communication device is resuming monitoring of at least one control channel occasion of the one or more control channel occasions during the time period, monitoring, within the time period, a first control channel occasion of the at least one control channel occasion for a second control message scheduling retransmission of the message, and skipping monitoring of a remaining one or more control channel occasions within the time period subsequent to the first control channel occasion.

A first wireless communication device for wireless communication is described. The first wireless communication device may include one or more memories storing processor executable code, and one or more processors coupled with the one or more memories. The one or more processors may individually or collectively operable to execute the code to cause the first wireless communication device to receive, from a second wireless communication device, a first control message scheduling transmission of a message and indicating to skip monitoring of one or more control channel occasions during a time period, transmit a feedback message indicating that the message was not successfully received and that the first wireless communication device is resuming monitoring of at least one control channel occasion of the one or more control channel occasions during the time period, monitor, within the time period, a first control channel occasion of the at least one control channel occasion for a second control message scheduling retransmission of the message, and skip monitoring of a remaining one or more control channel occasions within the time period subsequent to the first control channel occasion.

Another first wireless communication device for wireless communication is described. The first wireless communication device may include means for receiving, from a second wireless communication device, a first control message scheduling transmission of a message and indicating to skip monitoring of one or more control channel occasions during a time period, means for transmitting a feedback message indicating that the message was not successfully received and that the first wireless communication device is resuming monitoring of at least one control channel occasion of the one or more control channel occasions during the time period, means for monitoring, within the time period, a first control channel occasion of the at least one control channel occasion for a second control message scheduling retransmission of the message, and means for skipping monitoring of a remaining one or more control channel occasions within the time period subsequent to the first control channel occasion.

A non-transitory computer-readable medium storing code for wireless communication is described. The code may include instructions executable by a processor to receive, from a second wireless communication device, a first control message scheduling transmission of a message and indicating to skip monitoring of one or more control channel occasions during a time period, transmit a feedback message indicating that the message was not successfully received and that the first wireless communication device is resuming monitoring of at least one control channel occasion of the one or more control channel occasions during the time period, monitor, within the time period, a first control channel occasion of the at least one control channel occasion for a second control message scheduling retransmission of the message, and skip monitoring of a remaining one or more control channel occasions within the time period subsequent to the first control channel occasion.

Some examples of the method, first wireless communication devices, and non-transitory computer-readable medium described herein may further include operations, features, means, or instructions for receiving, from the second wireless communication device via the first control channel occasion, the second control message scheduling retransmission of the message and receiving, from the second wireless communication device, a retransmission of the message based on the second control message, where skipping monitoring of the remaining one or more control channel occasions may be based on successfully receiving the retransmission of the message.

Some examples of the method, first wireless communication devices, and non-transitory computer-readable medium described herein may further include operations, features, means, or instructions for transmitting a second feedback message indicating that the retransmission of the message was successfully received and that the first wireless communication device may be skipping monitoring of the remaining one or more control channel occasions within the time period.

Some examples of the method, first wireless communication devices, and non-transitory computer-readable medium described herein may further include operations, features, means, or instructions for skipping monitoring of the remaining one or more control channel occasions within the time period may be based on a quantity of attempted retransmissions of the message satisfying a threshold quantity of retransmissions.

Some examples of the method, first wireless communication devices, and non-transitory computer-readable medium described herein may further include operations, features, means, or instructions for skipping monitoring of the remaining one or more control channel occasions within the time period may be based on a quantity of feedback messages transmitted by the first wireless communication device within the time period.

In some examples of the method, first wireless communication devices, and non-transitory computer-readable medium described herein, the second control message may be a first type of control message and the method, apparatuses, and non-transitory computer-readable medium may include further operations, features, means, or instructions for refraining from monitoring the at least one control channel occasion for a second type of control message that may be different from the first type of control message.

Some examples of the method, first wireless communication devices, and non-transitory computer-readable medium described herein may further include operations, features, means, or instructions for skipping monitoring of a following one or more control channel occasions within a second time period subsequent to the time period.

In some examples of the method, first wireless communication devices, and non-transitory computer-readable medium described herein, the one or more control channel occasions include one or more PDCCH occasions.

In some examples of the method, first wireless communication devices, and non-transitory computer-readable medium described herein, the feedback message includes a NACK message of a HARQ process.

BRIEF DESCRIPTION OF THE DRAWINGS

FIGS. 9 and 10 show flowcharts illustrating methods that support pausing and resuming skipping of control channel monitoring in accordance with one or more aspects of the present disclosure.

DETAILED DESCRIPTION

Figure 1:
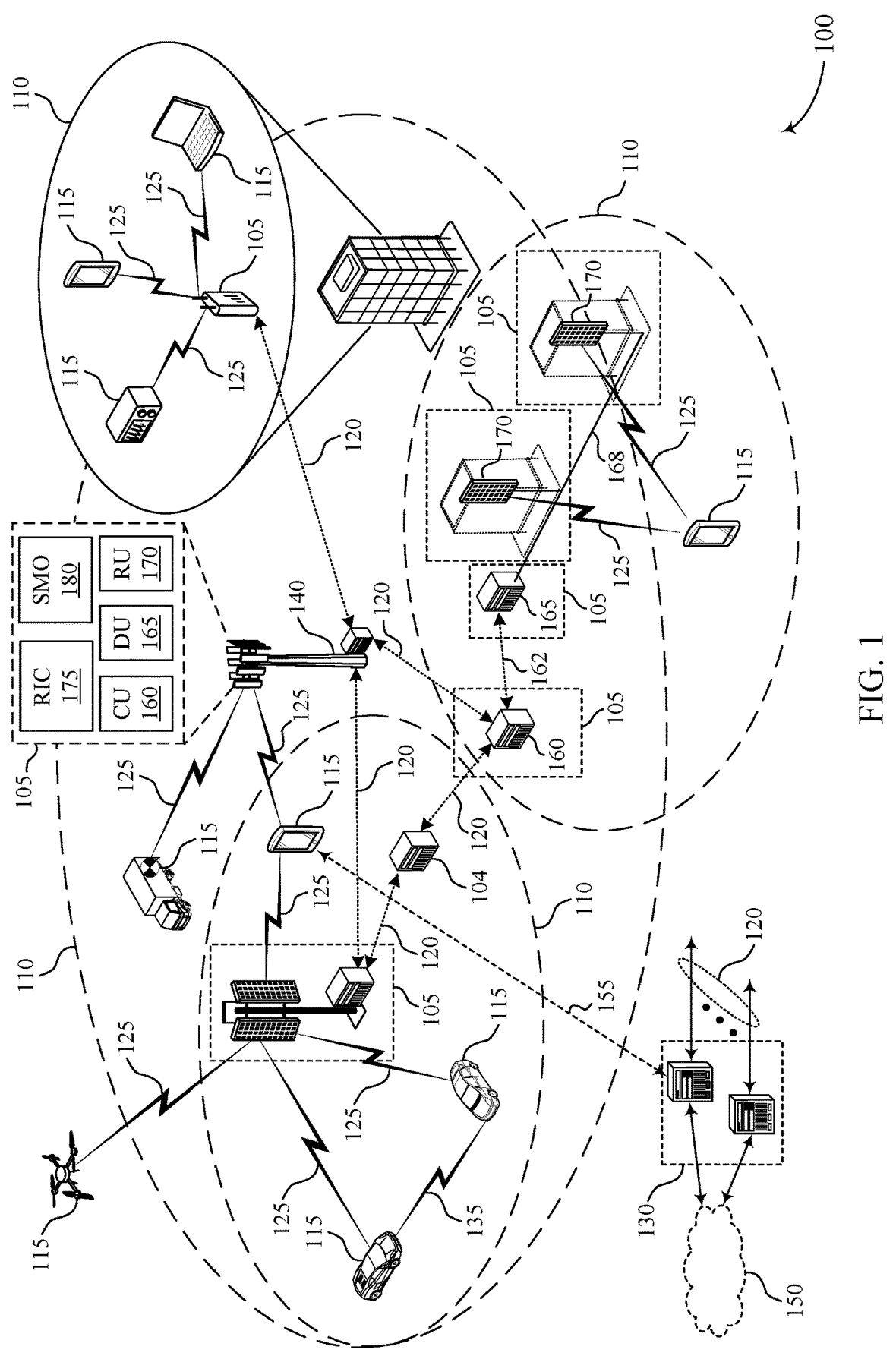
FIG. 1 shows an example of a wireless communications system that supports pausing and resuming skipping of control channel monitoring in accordance with one or more aspects of the present disclosure.

Some wireless communications systems, such as an extended reality (XR) system, may support XR applications, including cloud gaming applications, virtual reality (VR) split rendering applications, augmented reality (AR) split computation applications, and the like. To communicate XR data, an XR system may have traffic bursts (e.g., periodic, dynamic) between one or more wireless communication devices, including a combination of user equipments (UEs), network entities, among other devices. For example, a UE, such as an XR device, may monitor a control channel (e.g., a physical downlink control channel (PDCCH)) to receive a control message from a network entity to schedule one or more data transmissions (e.g., of an XR traffic burst via a physical downlink shared channel (PDSCH)) using resources specified in the control message. In some cases, to save power, a network entity or other device may indicate to the UE to skip monitoring of one or more control channel occasions for an indicated time duration (e.g., in slots or milliseconds (ms)) or an indicated quantity of control channel monitoring occasions (i.e., control channel occasions). If the UE fails to receive a data packet, the UE may send a negative acknowledgement (NACK) of a hybrid automatic repeat request (HARQ) process and may cancel the skipping for a rest of the time duration (e.g., after sending the NACK) for monitoring for a respective retransmission of the missing data packet from the network entity to avoid delays in the retransmission and other communications. However, cancelling skipping of control channel monitoring to receive a single retransmission may result in a waste of power.

In some implementations of the present disclosure, wireless communication devices of a wireless communications system may support enabling pausing and resuming skipping of control channel monitoring. For example, a wireless communication device, such as a UE or other XR device, may receive a control message scheduling transmission of a message such as an XR data packet and indicating to skip monitoring of control channel occasions in a time period. In response to a failure in receiving or decoding the message, the wireless communication device may transmit a feedback message (e.g., a NACK message) indicating the missed message and that the device is resuming control channel monitoring during the time period. The wireless communication device may temporarily pause control channel monitoring skipping (e.g., instead of cancelling for a remainder of the time period), may monitor for a control message scheduling a retransmission, and may later resume the skipping. By pausing and resuming skipping, the wireless communication device may avoid unnecessary waste of power from additional monitoring when no data is received while still reducing a latency of communications by monitoring for retransmissions when the skipping is paused. Additionally, or alternatively, a user experience may be improved due to improved framerate, video quality, and video stability from avoiding dropped frames during the paused skipping, for example, due to a small packet delay budget (PDB).

In some examples, the wireless communication device may resume skipping of control channel monitoring once one or more conditions are met. For example, the wireless communication device may transmit an acknowledgement (ACK) and may resume skipping for a remainder of a time period if the device successfully receives and decodes a retransmission control message and subsequent retransmission of a message. Additionally, or alternatively, the wireless communication device may resume skipping after a threshold maximum quantity of allowed re-transmissions is satisfied (e.g., met or exceeded), if re-transmissions are disabled, or if a quantity of feedback processes such as HARQ processes are cleared (e.g., completed). In some cases, the wireless communication device may resume skipping for one or more types of control messages, such as for a type of downlink control information (DCI) message, to further reduce power consumption by avoiding monitoring of other types of control messages. In some examples, the wireless communication device may resume skipping for a remainder of an originally indicated time duration for skipping monitoring, or for a remainder of an originally indicated quantity of control channel occasions. By way of another example, the wireless communication device may resume skipping for an additional time duration so that skipping is performed for a same total time duration as the originally indicated time duration, or for an additional quantity of control channel occasions so that skipping is performed for a same total quantity of control channel occasions as the originally indicated quantity of control channel occasions.

Aspects of the disclosure are initially described in the context of wireless communications systems. Aspects of the disclosure are further illustrated by and described with reference to wireless communications systems and process flows that relate to pausing and resuming skipping of control channel monitoring. Aspects of the disclosure are further illustrated by and described with reference to apparatus diagrams, system diagrams, and flowcharts that relate to pausing and resuming skipping of control channel monitoring.

FIG. 1 shows an example of a wireless communications system 100 that supports pausing and resuming skipping of control channel monitoring in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support pausing and resuming skipping of control channel monitoring as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support XR devices. For example, a UE 115 may be an XR device, which may include a VR device, an AR device, or a mixed reality (MR) device, where an MR device may include a combination of aspects from both VR devices and AR devices. In some cases, XR transmissions may have a low latency and may include delay-sensitive processes at a UE 115 (e.g., to improve quality of user experience). XR transmissions may also include high data throughput (e.g., high data rate) which may consume a large amount of power. For example, a network entity 105 may transmit large data packets, such as video frames, to a UE 115. Further, a UE 115 may be configured with a discontinuous reception (DRX) configuration (e.g., a connected mode DRX (C-DRX) configuration) in which the UE transitions to a power-saving sleep state between active times in which the UE monitors for communications from the network entity 105 (e.g., for monitoring a control channel, such as a PDCCH, for one or more transmissions). In some examples, an active time may include an ON duration, may be extended by an inactivity timer, or both.

In some examples, XR communications may include one or more traffic bursts. For example, a network entity 105 may transmit one or more data packets in an XR traffic burst (e.g., at the beginning of one or more DRX cycles). In some examples, each XR traffic burst may include variability in quantity and size of packets per burst. For example, one XR traffic burst at the beginning of a first DRX cycle may have three data packets of shorter lengths, whereas an XR traffic burst at the beginning of a second DRX cycle after the first cycle may have two data packets of larger lengths. In some cases, the XR traffic may be transmitted according to non-integer or integer periods. For example, a network entity 105 may transmit XR data at $\frac{1}{60}$ frames per second (fps), with a 16.67 ms period, or at $\frac{1}{120}$ fps, with a 8.33 ms period.

Jitter may be introduced in XR communications, causing arrival times of XR traffic to vary. For example, an XR traffic burst expected to arrive at the start of a DRX cycle may arrive late (e.g., 4 ms after the start of the DRX cycle). Additionally, or alternatively, jitter may cause an XR traffic burse to arrive before the start of a DRX cycle and within a previous DRX cycle (e.g., 4 ms before the start of the second DRX cycle). In some examples, jitter may be caused by processing at a network entity 105, interference, delays, and other factors. In some cases, the regular or periodic pattern of XR traffic may have a periodicity that does not correspond with an integer value of possible starting locations of DRX active times (e.g., starting time of DRX ON durations). For example, a DRX configuration may indicate an integer period (e.g., 16 ms), whereas a period of XR traffic may have a non-integer period (e.g., 16.66 ms), causing a tempo mismatch, where a UE 115 and the XR traffic may be out of sync at one or more times. Thus, jitter or tempo mismatch may cause a UE 115 to miss transmission of one or more messages.

XR traffic may also include one or more data flows. For example, a network entity 105 may transmit two data flows. In some examples, each data flow may have different configurations. For example, each data flow may have a different period and other varying characteristics and may be independent from one another. In some cases, a first data flow may carry video data, while a second data flow may carry audio data. By way of another example, for XR video data, the first data flow may carry video data for a left eye (e.g., for viewing with a left eye) while the second data flow may carry video data for a right eye for an XR device.

In some cases, XR communications may include a small PDB. For example, a UE 115 may miss reception of data for one or more video frames due to delays in processing, jitter, or tempo mismatch, and may wait until a next DRX cycle to receive the data. However, a resulting delay may exceed a PDB, where the UE 115 may discard data for one or more video frames when a PDB is violated (e.g., met or exceeded). In some cases, the network entity 105 may decide to not transmit data for one or more video frames after the time defined by the PDB. Violating a PDB may thus adversely affect user experience due to missing data for the one or more video frames. For example, such missing data may result in missing frames or other data, which may reduce a framerate, stability, or a quality of video at an XR device.

In some implementations of the present disclosure, wireless communication devices of the wireless communications system 100 may support enabling pausing and resuming skipping of control channel monitoring. For example, a wireless communication device, such as a UE 115 (e.g., an XR device), may receive a control message scheduling transmission of a message such as an XR data packet and indicating to skip monitoring of control channel occasions in a time period. In some cases, the time period may indicate to skip monitoring until a next DRX cycle. In response to a failure in receiving (or decoding) the scheduled message, the wireless communication device may transmit a NACK message indicating the missed message and that the device is resuming control channel monitoring during the time period. The wireless communication device may temporarily pause skipping to monitor for a control message scheduling a retransmission and may resume skipping of control channel monitoring (e.g., once one or more conditions are met, such as once a retransmission is successfully received). By pausing and resuming skipping, the wireless communication device may avoid additional waste of power from monitoring when no data is received while also reducing a latency of communications by avoiding waiting until an end of the time period to receive a retransmission. Further, pausing skipping may avoid violating a PDB (e.g., a PDB smaller than the time period), which may improve a user experience by avoiding missed or dropped frames, which may lead to increases framerate, improved video quality, improved video stability, among provide improved features.

Figure 2:
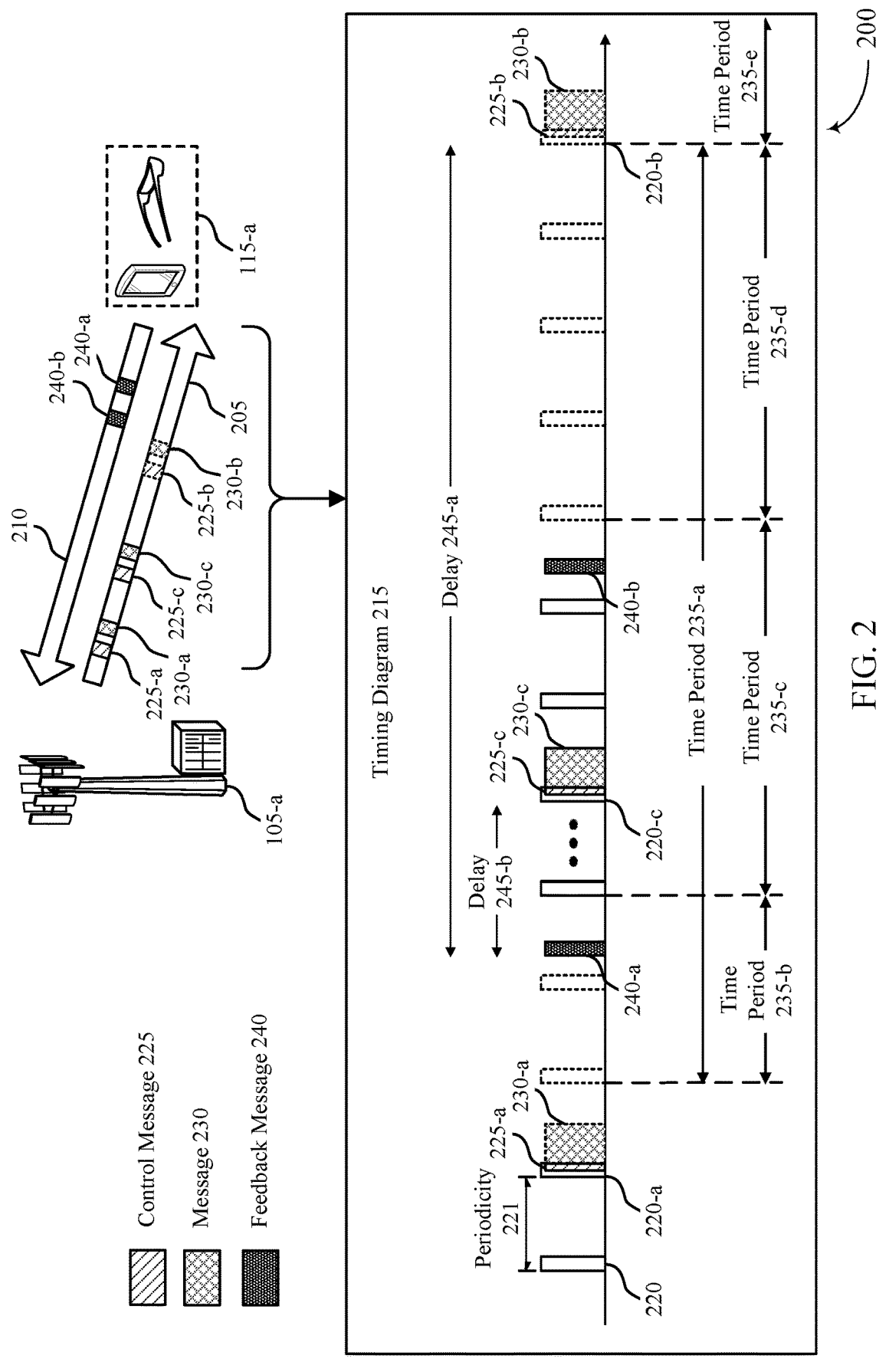
FIG. 2 shows an example of a wireless communications system that supports pausing and resuming skipping of control channel monitoring in accordance with one or more aspects of the present disclosure.

FIG. 2 shows an example of a wireless communications system 200 that supports pausing and resuming skipping of control channel monitoring in accordance with one or more aspects of the present disclosure. The wireless communications system 200 may implement or be implemented to realize aspects of the wireless communications system 100. For example, the wireless communications system 200 may include a network entity 105-a and a UE-115-a, which may represent examples of the network entities 105 and the UEs 115 described with reference to FIG. 1. In some examples, the network entity 105-a may transmit control information, data, or both to the UE 115-a using a downlink communication link 205. Similarly, the UE 115-a may transmit control information, data, or both to the network entity 105-a using an uplink communication link 210. Devices of the wireless communications system 200 may support pausing and resuming skipping of control channel monitoring as described herein.

For example, the UE 115-a may represent an XR device as described with reference to FIG. 1 and may receive XR traffic, including control information, data, or both. In some examples, the UE 115-a may receive the XR traffic and other communications directly from the network entity 105-a via the downlink communication link 205. Additionally, or alternatively, the UE 115-a may receive XR traffic and other communications indirectly via a sidelink communication link (e.g., a D2D communication link 135), where the XR traffic and communications may be forwarded by another wireless communication device in communication with the network entity 105-a. In some cases, the UE 115-a may forward XR traffic and other communications received from the network entity 105-a (or from another wireless communication device) to an XR device using a sidelink communication link.

As illustrated in timing diagram 215, the UE 115-a (e.g., a first wireless communication device) may perform control channel monitoring. For example, the UE 115-a may monitor one or more control channel occasions 220 associated with one or more control channels for control messages 225 according to a periodicity 221 (e.g., configured via RRC signaling). The control messages 225 may be examples of DCI messages including grants, resources, or both, for scheduling respective messages 230 for reception at the UE 115-a. For example, the UE 115-a may perform PDCCH monitoring, where the UE 115-a may monitor a PDCCH of the downlink communication link 205 during each of the control channel occasions 220 for reception of PDCCH control messages including grants scheduling XR traffic. In some examples, a control message 225 may be received in a PDCCH or another control channel, such as a physical uplink control channel (PUCCH) (e.g., if a network entity 105-a is receiving XR data from a UE 115) or a sidelink control channel (e.g., from another device forwarding data). Additionally, or alternatively, a message 230 may be received in a PDSCH or another data channel, such as a physical uplink shared channel (PUSCH) or a sidelink data channel. In some cases, a control message 225 may be a DCI format 0_1 or a DCI format 1_1.

In some examples, the network entity 105-a and the UE 115-a may support indication for and performance of control channel monitoring skipping (e.g., PDCCH skipping). For example, the UE 115-a may receive a control message 225-a (e.g., a DCI message) indicating to skip control channel monitoring for one or more control channel occasions 220 in a time period 235-a.

In some examples, the control message 225-a may indicate a duration of time for skipping control channel monitoring. For example, the UE 115-a may receive an RRC message or other signaling indicating a list of different values (e.g., up to 3, or another value) for a quantity of slots (e.g., time slots) for the UE 115-a to skip control channel monitoring. In some examples, the UE 115-a and the network entity 105-a may support different quantities of slots for skipping (e.g., up to 100 ms) for different values of subcarrier spacing (SCS) in kilohertz (kHz) as defined in Table 1 below:

TABLE 1

| SCS | X (in slots) |
| --- | --- |
| 15 kHz | {1, 2, 3, . . . 20, 30, 40, 50, 60, 80, 100} |
| 30 kHz | {1, 2, 3, . . . 40, 60, 80, 100, 120, 160, 200} |
| 60 kHz | {1, 2, 3, . . . 80, 120, 160, 200, 240, 320, 400} |
| 120 kHz | {1, 2, 3, . . . 160, 240, 320, 400, 480, 640, 800} |

In some examples, a control channel message 225 may be an example of a DCI message including, in addition to a grant, a field to indicate a quantity X of slots, which may be selected from the RRC configured list of values. For example, the UE 115-a may receive, in a field of the control message 225-a received while monitoring the control channel occasion 220-a, an indication of one of the RRC configured values. In response, the UE 115-a may skip control channel monitoring for the X slots indicated by the field, which may correspond to the time period 235-*a*. For example, the UE 115-*a* may skip monitoring of one or more control channel occasions 220 for X slots following the control channel occasion 220-*a* until a control channel occasion 220-*b*. The UE 115-*a* may resume control channel monitoring at the control channel occasion 220-*b* and may receive a control message 225-*b* scheduling a message 230-*b*.

In some examples, the indicated time duration may be an example of a duration of time in milliseconds (ms) for the UE 115-*a* to skip PDCCH monitoring (e.g., instead of a quantity of slots). Additionally, or alternatively, the control channel message 225-*a* may indicate a quantity of control channel occasions 220 (e.g., in the field of the DCI message) for skipping control channel monitoring. For example, the control channel occasions 220 illustrated within the time period 235-*a* may correspond to the indicated quantity of control channel occasions 220, where the time period 235-*a* may be based on the quantity. In some examples, the indicated slots, time period, or control channel occasions 220 may be based on a time duration (e.g., of slots, ms) or quantity of monitoring occasions until a beginning of a next DRX cycle. For example, a next DRX cycle may begin at the control channel occasion 220-*b*.

In some examples, an indication to skip control channel monitoring may be implicit. For example, the UE 115-*a* may store a value, such as a quantity of X slots, a time in ms, or a quantity of control channel occasions 220, which may be configured by RRC or previously stored. Based on receiving the control message 225-*a* including a grant scheduling reception of the message 230-*a*, the UE 115-*a* may skip control channel monitoring for the time period 235-*a* using the stored value. In some examples, the control channel message 225-*a* may not include a field for indicating to skip. Additionally, or alternatively, the control channel message 225-*a* may include both a field indicating the value and an additional field indicating whether to skip control channel monitoring or not.

In some examples, the network entity 105-*a* may transmit an indication to skip monitoring if the network entity does not have data to transmit to the UE 115-*a* during the indicated time duration or control channel occasions 220. For example, in XR, the network entity 105-*a* may transmit the indication so that the UE 115-*a* may save power between bursts of XR traffic.

For example, by skipping control channel monitoring, the UE 115-*a* may save power. In some examples, the UE 115-*a* may be a headset (VR or AR glasses), with a small form factor with a small or limited battery and may not be connected to a power supply at times. By reducing a time duration (e.g., of slots or ms) or a quantity of control channel occasions 220 in which the UE 115-*a* is performing monitoring (e.g., for XR traffic scheduling and reception), a battery life of the UE 115-*a* may be extended. For example, the UE 115-*a* may power down one or more components associated with monitoring or other processes (e.g., for a power saving mode or sleep mode) when skipping control channel monitoring.

However, in some examples, the UE 115-*a* may fail to receive a transmission scheduled by a control message 225 (e.g., DCI message) indicating to skip control channel monitoring. For example, the UE 115-*a* may receive the control message 225-*a* scheduling reception of the message 230-*a*, but the UE 115-*a* may fail to detect or receive the message 230-*a*, and may send a feedback message 240-*a*, such as a NACK message, to the network entity 105-*a* indicating the failed reception. Additionally, or alternatively, the UE 115-*a* may receive the message 230-*a* and may fail to decode the message and subsequently transmit the feedback message 240-*a*. In some examples, the UE 115-*a* may transmit the feedback message 240-*a* immediately following the failed reception or after one or more control channel occasions 220 (e.g., while attempting to decode the message).

Due to the indication to skip monitoring during the time period 235-*a*, the UE 115-*a* may wait until after the time period 235-*a* expires (e.g., until a next DRX cycle) to receive a retransmission once the UE 115-*a* resumes monitoring. For example, the message 230-*b* may represent a retransmission of the message 230-*a*. This may result in a delay 245-*a* for such messaging, which may increase a latency of communications. Further, in delay or latency sensitive XR applications, such skipping may result in poor user experience due to missing frames, low framerate, low stability, or poor video quality, for example, as a PDB may be exceeded due to the delay/latency and data for one or more frames related to the message 230-*a* may be dropped. Additionally, or alternatively, the UE 115-*a* may receive one or more additional XR traffic bursts (e.g., from another device, unknown or unexpected by the network entity 105-*a*, or both) during the time period 235-*a* which may also be missed or delayed.

In some examples, to mitigate delays and user experience, the UE 115-*a* and the network entity 105-*a* may support enhancements to control channel skipping including resuming control channel monitoring. For example, if control channel skipping is active and a NACK message is sent to the network entity 105-*a* for a downlink transmission, control channel skipping may be canceled. In an example, in response to the failed message 230-*a* and following the transmission of the feedback message 240-*a* including a NACK, the UE 115-*a* may resume control channel (e.g., PDCCH) monitoring during the control channel occasions 220 of the time period 235-*a* following the feedback message 240-*a* transmission to allow the UE 115-*a* to receive the retransmission of the message 230-*a*. The UE 115-*a* may monitor one or more control channel occasions 220, including a control channel occasion 220-*c*, and may receive an earlier control message 225-*c* scheduling a retransmission of the message 230-*a* represented by a message 230-*c*. Thus, the delay 245-*a* may be reduced to a delay 245-*b*, reducing latency in transmissions and avoiding missed frames, which may improve user experience and device performance in XR, among other applications.

However, cancelling skipping of control channel monitoring (e.g., resuming control channel monitoring) may be power inefficient and reduce power savings at the UE 115-*a*. For example, following the resumption of monitoring after the feedback message 240-*a* transmission, the UE 115-*a* may continue control channel monitoring for the remainder of the time period 235-*a*. However, in some cases, the UE 115-*a* may not receive additional messaging besides the retransmission during the remainder of the time period 235-*a*. For example, the initial value indicated in the control message 225-*a* may have been based on a lack of transmissions (e.g., scheduled or predicted) during that time as described herein, where the UE resumed monitoring due to the failed reception of the single message 230-*a*. Thus, improvements to monitoring and power savings may be realized.

For example, the UE 115-*a* may resume skipping to increase a power efficiency at the UE 115-*a*. In an example, if the control message 225-*a* indicates to skip control channel monitoring, the UE 115-*a* may pause (e.g., instead of cancel) control channel monitoring skipping, and may resume skipping of control channel monitoring at a later time. For example, the UE 115-*a* may pause skipping after a HARQ NACK message transmission, such as the feedback message 240-*b*, is sent by temporarily resuming control channel monitoring (e.g., for retransmission control messages). The UE 115-*a* may then resume control channel monitoring skipping at a later time.

In some examples, the UE 115-*a* may resume skipping control channel monitoring after a temporary pause based on one or more conditions being satisfied (e.g., rule-based resumption). For example, the UE 115-*a* may fail to receive or decode the message 230-*a* and may pause control channel monitoring skipping after the time period 235-*b* once the feedback message 240-*a* (e.g., NACK message) has been sent. In some examples, the UE 115-*a* may resume skipping control channel monitoring if an ACK message is sent for a same message or process (e.g., HARQ process) that triggered the pausing of the PDCCH skipping (e.g., after the retransmission is received and when not expecting further transmissions). For example, the UE 115-*a* may resume skipping (e.g., PDCCH skipping) after the time period 235-*c* following sending a feedback message 240-*b*, such as a HARQ ACK, after successful reception of the message 230-*c* (e.g., a retransmission) if the UE 115-*a* transmitted a NACK message for the corresponding original message (e.g., the feedback message 240-*a* transmitted for the message 230-*a*). Additionally, or alternatively, the UE 115-*a* may pause skipping based on receiving an indication from the network entity 105-*a* following transmission of the NACK message, and may resume skipping in response to an indication from the network entity 105-*a* transmitted in response to the ACK. By resuming skipping once a retransmission is successfully received, the UE 115-*a* may both improve a latency of communications while increasing power savings when the UE 115-*a* is not receiving messaging.

Additionally, or alternatively, the UE 115-*a* may resume control channel monitoring skipping based on satisfying a threshold quantity of retransmissions. For example, the UE 115-*a* may receive an RRC message indicating, or have stored at the UE 115-*a*, a maximum threshold quantity of retransmissions. Based on failing to receive or decode the message 230-*a*, the UE 115-*a* may transmit a NACK in the feedback message 240-*a*, and may resume monitoring for one or more retransmissions. The UE 115-*a* may fail to receive or decode the retransmissions until a quantity of received retransmissions of the message 230-*a* is equal to or exceeds the maximum threshold quantity of retransmissions. Once the threshold is met or exceeded, the UE 115-*a* may resume skipping control channel monitoring. Such a threshold may allow the UE 115-*a* to increase power savings by avoiding a quantity of unnecessary retransmission attempts above the threshold.

In some examples, retransmissions may be disabled (e.g., for non-terrestrial networks (NTN)), in which case the UE 115-*a* may refrain from cancelling or pausing skipping of control channel monitoring (e.g., may continue skipping monitoring for the entirety of or at least a portion of the time period 235-*a*). In some cases, retransmissions being disabled may be indicated by the maximum threshold quantity of transmissions being set to 0. Additionally, or alternatively, the UE 115-*a* may resume skipping once some or all HARQ processes are cleared (e.g., if no pending HARQ processes exist, such as an ACK message or NACK message to transmit). In some examples, conditions may be specified (e.g., stored at the UE 115-*a*), configured by a network or network entity (e.g., via RRC), or requested by the UE 115-*a*. Additionally, or alternatively, the UE 115-*a* may resume skipping control channel monitoring based on a duration of time expiring (e.g., a timer-based resumption), where the duration may be indicated in DCI, configured in RRC, or stored at the UE 115-*a*.

In some examples, the UE 115-*a* may pause, cancel, or resume skipping based on a type of control message (e.g., a specific type of DCI message). For example, during the time period 235-*c*, the UE 115-*a* may monitor control channel occasions 220 for DCI which schedule uplink transmissions (e.g., DCI format 0_1) from the UE 115-*a* to the network entity 105-*a*. Additionally, or alternatively, the UE 115-*a* may monitor control channel occasions 220 for DCI messages which schedule downlink transmissions (e.g., DCI format 1_1), such as the control messages 225-*a* scheduling the messages 230. In some cases, the UE 115-*a* may monitor for any type of DCI message before cancelling or pausing PDCCH monitoring, and may resume control channel monitoring for a specific DCI message type. For example, the UE 115-*a* may resume monitoring for uplink scheduling DCI messages based on a pending scheduling request (SR), or may resume monitoring for downlink scheduling DCI messages carrying a retransmission based on a pending NACK. By doing so the UE 115-*a* may reduce a quantity of blind decodes, may save power by reducing a quantity of channels being monitored, or both.

In some examples, the UE 115-*a* may resume skipping for a remainder of a value of the original indication for the skipping. For example, the indication in the control message 225-*a* to pause or cancel skipping may indicate an original time duration (e.g., slots, ms) for skipping PDCCH monitoring corresponding to the time period 235-*a*. The skipping pause during the time period 235-*c* may be part of the original duration, and the UE 115-*a* may resume skipping during the time period 235-*d* for the remainder of the duration of the time period 235-*a*. The UE 115-*a* may similarly resume skipping for a remaining quantity of control channel occasions 220 of an indicated original quantity of control channel occasions 220 for skipping (e.g., in a field of an original scheduling DCI message).

In some examples, the UE 115-*a* may resume skipping for a duration such that a sum of time (e.g., in slots or ms) is the same as a duration of the original induction for skipping. For example, the skipping pause during the time period 235-*c* may not be part of the original duration, and the UE 115-*a* may resume skipping during the time period 235-*d* for a remainder of the original timer period 235-*a* as well as for an additional time period 235-*e* so that a sum of the durations of the time periods 235-*b*, 235-*d*, and 235-*e* are equal to a duration indicated in the control message 225-*a* (e.g., an original duration of the time period 235-*a*). Similarly, the UE 115-*a* may skip monitoring for a remainder quantity and an additional quantity control channel occasions 220 to maintain a total quantity of skipped control channel occasions 220.

In some examples, the UE 115-*a* may perform control channel monitoring, skipping, and resumption of skipping based on one or more rules configured or stored at the UE 115-*a*. Additionally, or alternatively, the operations described herein may be performed at the network entity 105-*a*, at a different XR device (e.g., to which control messages and XR data is forwarded by the UE 115-*a*), or both.

Figure 3:
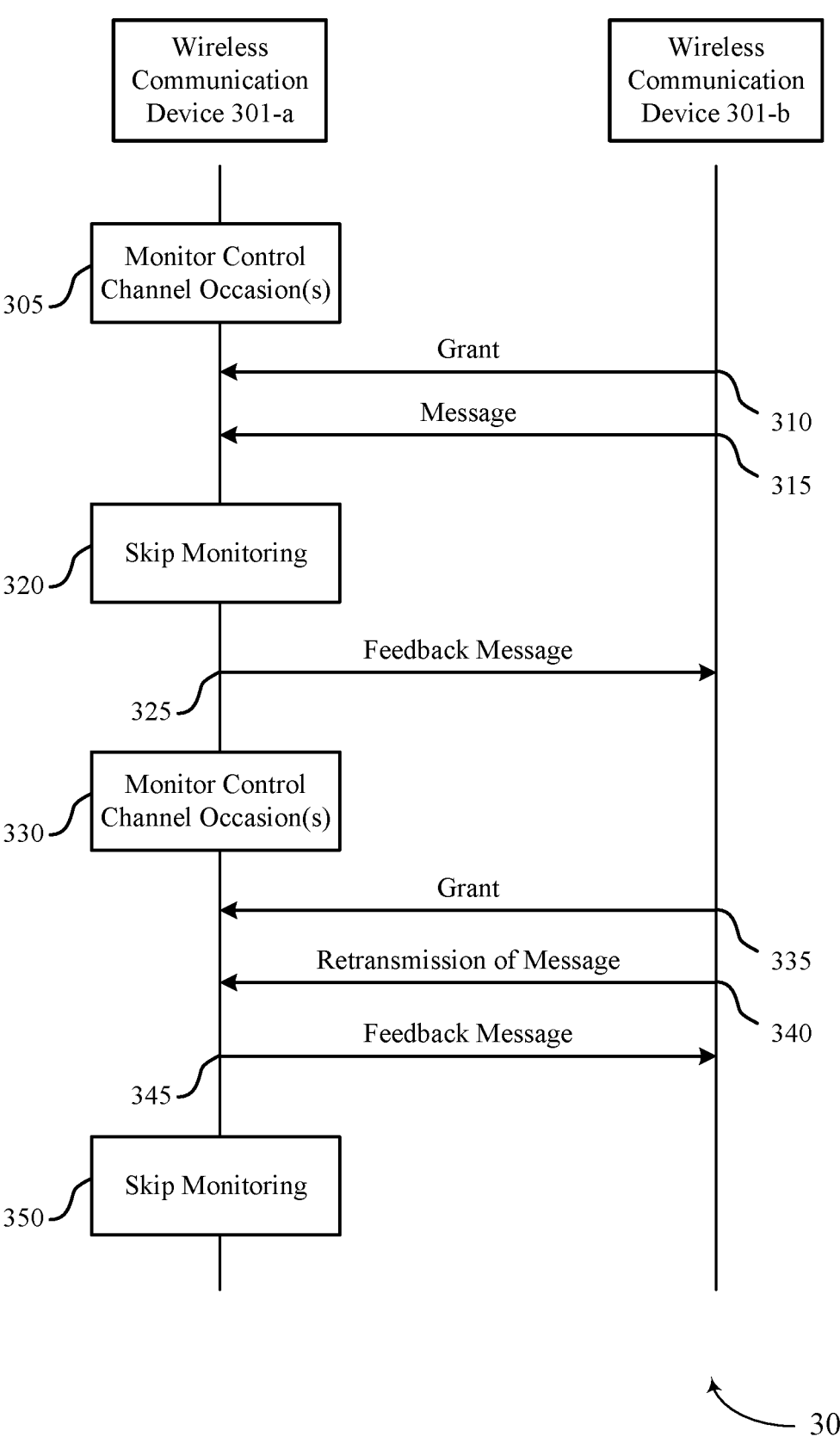
FIG. 3 shows an example of a process flow that supports pausing and resuming skipping of control channel monitoring in accordance with one or more aspects of the present disclosure.

FIG. 3 shows an example of a process flow 300 that supports pausing and resuming skipping of control channel monitoring in accordance with one or more aspects of the present disclosure. The process flow 300 may implement or be implemented to realize aspects of the wireless communications system 100 or the wireless communications system 200. For example, the process flow 300 illustrates communication between a wireless communication device 301-a and a wireless communication device 301-b, which may be examples of UEs 115 such as XR devices, network entities 105, other devices, or any combination thereof as illustrated by and described with reference to FIGS. 1 and 2.

In the following description of the process flow 300, the operations may be performed (such as reported or provided) in a different order than the order shown, or the operations performed by the example devices may be performed in different orders or at different times. Some operations also may be omitted from the process flow 300, or other operations may be added to the process flow 300. Further, although some operations or signaling may be shown to occur at different times for discussion purposes, these operations may actually occur at the same time or otherwise concurrently.

At 305, the wireless communication device 301-a (e.g., a first wireless communication device) may monitor a plurality of control channel occasions for one or more control messages scheduling transmission of one or more messages. For example, the wireless communication device 301-a may monitor a plurality of control channel occasions 220 for reception of one or more control messages 225 scheduling XR traffic as described with respect to FIG. 2.

At 310, the wireless communication device 301-b (e.g., a second wireless communication device) may transmit, and the wireless communication device 301-a may receive, a control message (e.g., a grant, DCI, etc.) scheduling transmission of a message and indicating to skip monitoring of one or more control channel occasions during a time period. For example, the wireless communication device 301-a may receive the control message 225-a including a grant scheduling the message 230-a and indicating (explicitly or implicitly) to skip monitoring of one or more control channel occasions 220 in the time period 235-a. In some examples, the one or more control channel occasions may include one or more PDCCH occasions (e.g., occasions for monitoring a PDCCH for DCI messages), or occasions for monitoring one or more other control channels. In some cases, receiving the control message may be based on the monitoring at 305.

At 315, the wireless communication device 301-b may transmit, and the wireless communication device 301-a may receive, the message based on the control message. For example, the wireless communication device 301-a may receive the message 230-a using resources indicated in the control message 225-a (e.g., included in the control message or stored at the wireless communication device 301-a and referenced explicitly or implicitly by the control message).

At 320, the wireless communication device 301-a may skip monitoring of the one or more control channel occasions within the time period. For example, the wireless communication device 301-a may skip monitoring one or more control channel occasions 220 during the time period 235-b.

At 325, the wireless communication device 301-a may transmit, and the wireless communication device 301-b may receive, a feedback message indicating that the message was not successfully received. For example, the wireless communication device 301-a may transmit a NACK message of a HARQ process, such as the feedback message 240-a. In some examples, the feedback message may indicate that the wireless communication device 301-a is resuming monitoring of at least one control channel occasion of the one or more control channel occasions during the time period.

At 330, the wireless communication device 301-a may monitor, within the time period, a control channel occasion of the at least one control channel occasion for an additional control message scheduling retransmission of the message. For example, the wireless communication device 301-a may monitor the one or more control channel occasions 220 including the control channel occasion 220-c within the time period 235-c.

At 335, the wireless communication device 301-b may transmit, and the wireless communication device 301-a may receive via the control channel occasion, the additional control message scheduling retransmission of the message. For example, the wireless communication device 301-a may receive the control message 225-c during the control channel occasion 220-c for scheduling the message 230-c. In some examples, the additional control message may be a first type of control message, where the wireless communication device 301-a may refrain from monitoring the at least one control channel occasion for another type of control message that is different from the first type of control message as described with respect to FIG. 2.

At 340, the wireless communication device 301-b may transmit, and the wireless communication device 301-a may receive, a retransmission of the message based on the additional control message. For example, the wireless communication device 301-a may receive the message 230-c scheduled by the control message 225-c.

At 345, the wireless communication device 301-a may transmit, and the wireless communication device 301-b may receive, another feedback message indicating that the retransmission of the message was successfully received and that the wireless communication device 301-a is skipping monitoring of the remaining one or more control channel occasions within the time period. For example, the wireless communication device 301-a may transmit an ACK, such as the feedback message 240-b.

At 350, the wireless communication device 301-a may skip monitoring of a remaining one or more control channel occasions within the time period subsequent to the first control channel occasion. For example, the wireless communication device 301-a may skip one or more control channel occasions 220 during the time period 235-d, the time period 235-e, or both. In some examples, skipping monitoring of the remaining one or more control channel occasions may be based on successfully receiving the retransmission of the message as described with respect to FIG. 2. Additionally, or alternatively, the skipping may be based on a quantity of attempted retransmissions of the message satisfying a threshold quantity of retransmissions, may be based on a quantity of feedback messages (e.g., HARQ ACK or NACK messages) transmitted by the wireless communication device 301-a within the time period, or both.

In some examples, the wireless communication device 301-a may skip monitoring of the remaining one or more control channel occasions within the time period so that a remaining time duration (e.g., slots, ms) or a remaining quantity of control channel occasions (e.g., 220) may be skipped as described with respect to FIG. 2. For example, the wireless communication device 301-a may skip monitoring of control channel occasions 220 within the time period 235-d and may resume monitoring following the time period 235-d. The wireless communication device 301-a may also skip monitoring of a following one or more control channel occasions within a second time period subsequent to the time period, and may resume skipping for a duration such that the sum of all skips is the same as the duration of the original induction for the skipping. For example, the wireless communication device 301-*a* may resume skipping during both the time periods 235-*d* and 235-*e* to skip for a total indicated time duration or total indicated quantity of control channel occasions 220.

Figure 4:
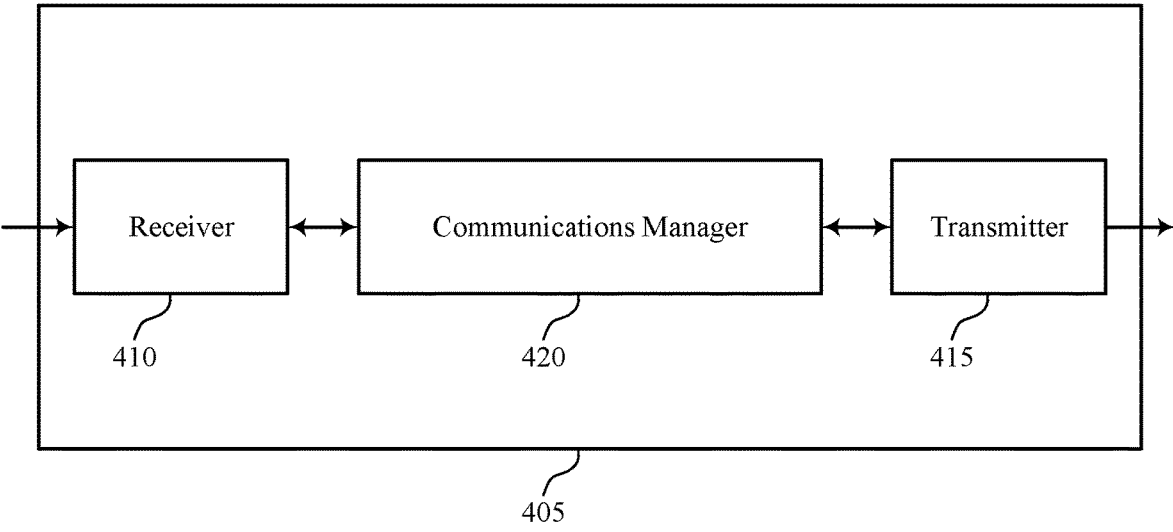
FIGS. 4 and 5 show block diagrams of devices that support pausing and resuming skipping of control channel monitoring in accordance with one or more aspects of the present disclosure.

FIG. 4 shows a block diagram 400 of a device 405 that supports pausing and resuming skipping of control channel monitoring in accordance with one or more aspects of the present disclosure. The device 405 may be an example of aspects of a UE 115 or a network entity 105 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to pausing and resuming skipping of control channel monitoring). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to pausing and resuming skipping of control channel monitoring). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of pausing and resuming skipping of control channel monitoring as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication in accordance with examples as disclosed herein. For example, the communications manager 420 is capable of, configured to, or operable to support a means for receiving, from a second wireless communication device, a first control message scheduling transmission of a message and indicating to skip monitoring of one or more control channel occasions during a time period. The communications manager 420 is capable of, configured to, or operable to support a means for transmitting a feedback message indicating that the message was not successfully received and that the first wireless communication device is resuming monitoring of at least one control channel occasion of the one or more control channel occasions during the time period. The communications manager 420 is capable of, configured to, or operable to support a means for monitoring, within the time period, a first control channel occasion of the at least one control channel occasion for a second control message scheduling retransmission of the message. The communications manager 420 is capable of, configured to, or operable to support a means for skipping monitoring of a remaining one or more control channel occasions within the time period subsequent to the first control channel occasion.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for more reduced processing, reduced power consumption, and more efficient utilization of communication resources by both pausing skipping of monitoring and resuming skipping of monitoring.

Figure 5:
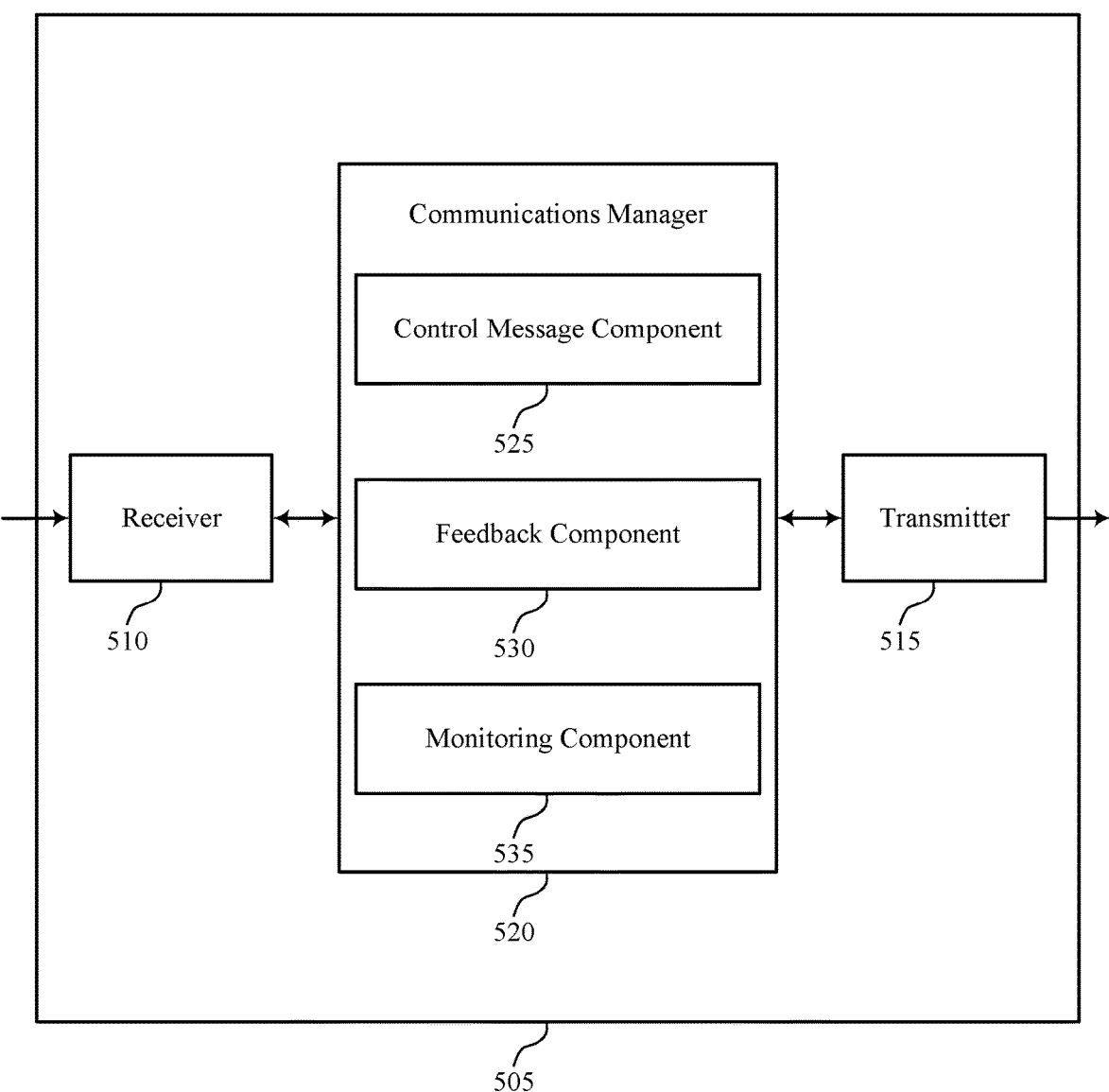

FIG. 5 shows a block diagram 500 of a device 505 that supports pausing and resuming skipping of control channel monitoring in accordance with one or more aspects of the present disclosure. The device 505 may be an example of aspects of a device 405, a UE 115, or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to pausing and resuming skipping of control channel monitoring). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to pausing and resuming skipping of control channel monitoring). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of pausing and resuming skipping of control channel monitoring as described herein. For example, the communications manager 520 may include a control message component 525, a feedback component 530, a monitoring component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The control message component 525 is capable of, configured to, or operable to support a means for receiving, from a second wireless communication device, a first control message scheduling transmission of a message and indicating to skip monitoring of one or more control channel occasions during a time period. The feedback component 530 is capable of, configured to, or operable to support a means for transmitting a feedback message indicating that the message was not successfully received and that the first wireless communication device is resuming monitoring of at least one control channel occasion of the one or more control channel occasions during the time period. The monitoring component 535 is capable of, configured to, or operable to support a means for monitoring, within the time period, a first control channel occasion of the at least one control channel occasion for a second control message scheduling retransmission of the message. The monitoring component 535 is capable of, configured to, or operable to support a means for skipping monitoring of a remaining one or more control channel occasions within the time period subsequent to the first control channel occasion.

Figure 6:
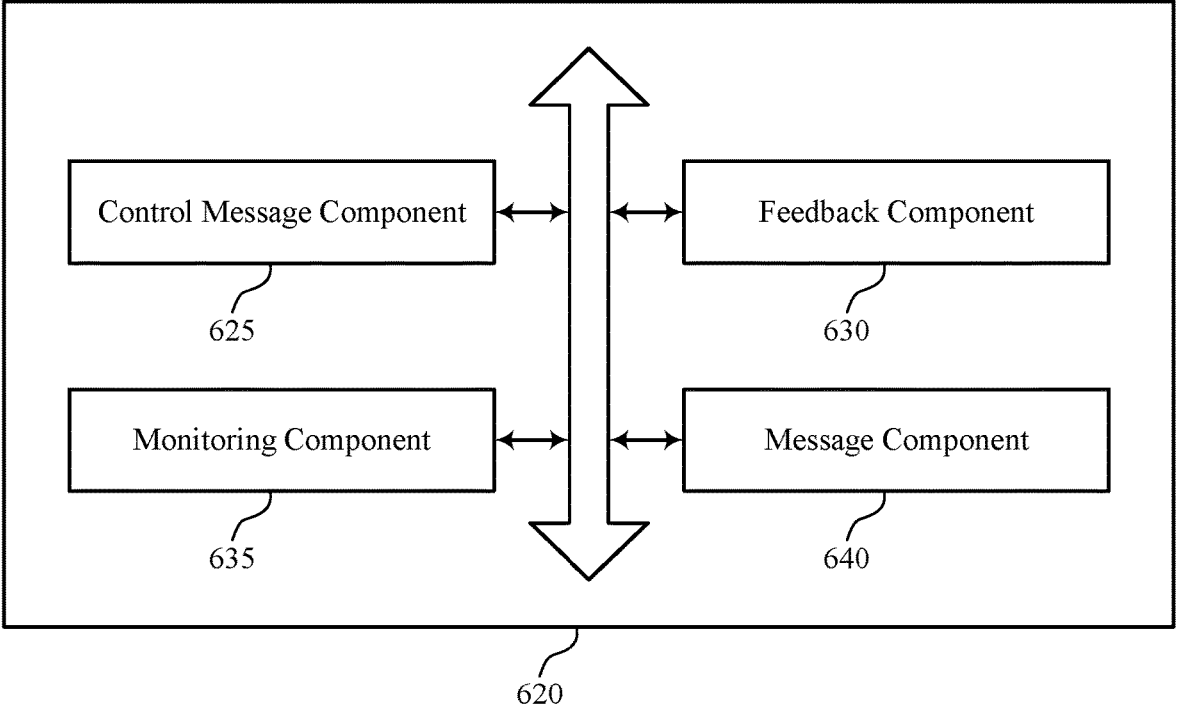
FIG. 6 shows a block diagram of a communications manager that supports pausing and resuming skipping of control channel monitoring in accordance with one or more aspects of the present disclosure.

FIG. 6 shows a block diagram 600 of a communications manager 620 that supports pausing and resuming skipping of control channel monitoring in accordance with one or more aspects of the present disclosure. The communications manager 620 may be an example of aspects of a communications manager 420, a communications manager 520, or both, as described herein. The communications manager 620, or various components thereof, may be an example of means for performing various aspects of pausing and resuming skipping of control channel monitoring as described herein. For example, the communications manager 620 may include a control message component 625, a feedback component 630, a monitoring component 635, a message component 640, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communication in accordance with examples as disclosed herein. The control message component 625 is capable of, configured to, or operable to support a means for receiving, from a second wireless communication device, a first control message scheduling transmission of a message and indicating to skip monitoring of one or more control channel occasions during a time period. The feedback component 630 is capable of, configured to, or operable to support a means for transmitting a feedback message indicating that the message was not successfully received and that the first wireless communication device is resuming monitoring of at least one control channel occasion of the one or more control channel occasions during the time period. The monitoring component 635 is capable of, configured to, or operable to support a means for monitoring, within the time period, a first control channel occasion of the at least one control channel occasion for a second control message scheduling retransmission of the message. In some examples, the monitoring component 635 is capable of, configured to, or operable to support a means for skipping monitoring of a remaining one or more control channel occasions within the time period subsequent to the first control channel occasion.

In some examples, the control message component 625 is capable of, configured to, or operable to support a means for receiving, from the second wireless communication device via the first control channel occasion, the second control message scheduling retransmission of the message. In some examples, the message component 640 is capable of, configured to, or operable to support a means for receiving, from the second wireless communication device, a retransmission of the message based on the second control message, where skipping monitoring of the remaining one or more control channel occasions is based on successfully receiving the retransmission of the message.

In some examples, the feedback component 630 is capable of, configured to, or operable to support a means for transmitting a second feedback message indicating that the retransmission of the message was successfully received and that the first wireless communication device is skipping monitoring of the remaining one or more control channel occasions within the time period.

In some examples, skipping monitoring of the remaining one or more control channel occasions within the time period is based on a quantity of attempted retransmissions of the message satisfying a threshold quantity of retransmissions.

In some examples, skipping monitoring of the remaining one or more control channel occasions within the time period is based on a quantity of feedback messages transmitted by the first wireless communication device within the time period.

In some examples, the second control message is a first type of control message, and the monitoring component 635 is capable of, configured to, or operable to support a means for refraining from monitoring the at least one control channel occasion for a second type of control message that is different from the first type of control message.

In some examples, the monitoring component 635 is capable of, configured to, or operable to support a means for skipping monitoring of a following one or more control channel occasions within a second time period subsequent to the time period.

In some examples, the one or more control channel occasions include one or more PDCCH occasions.

In some examples, the feedback message includes a NACK message of a HARQ process.

Figure 7:
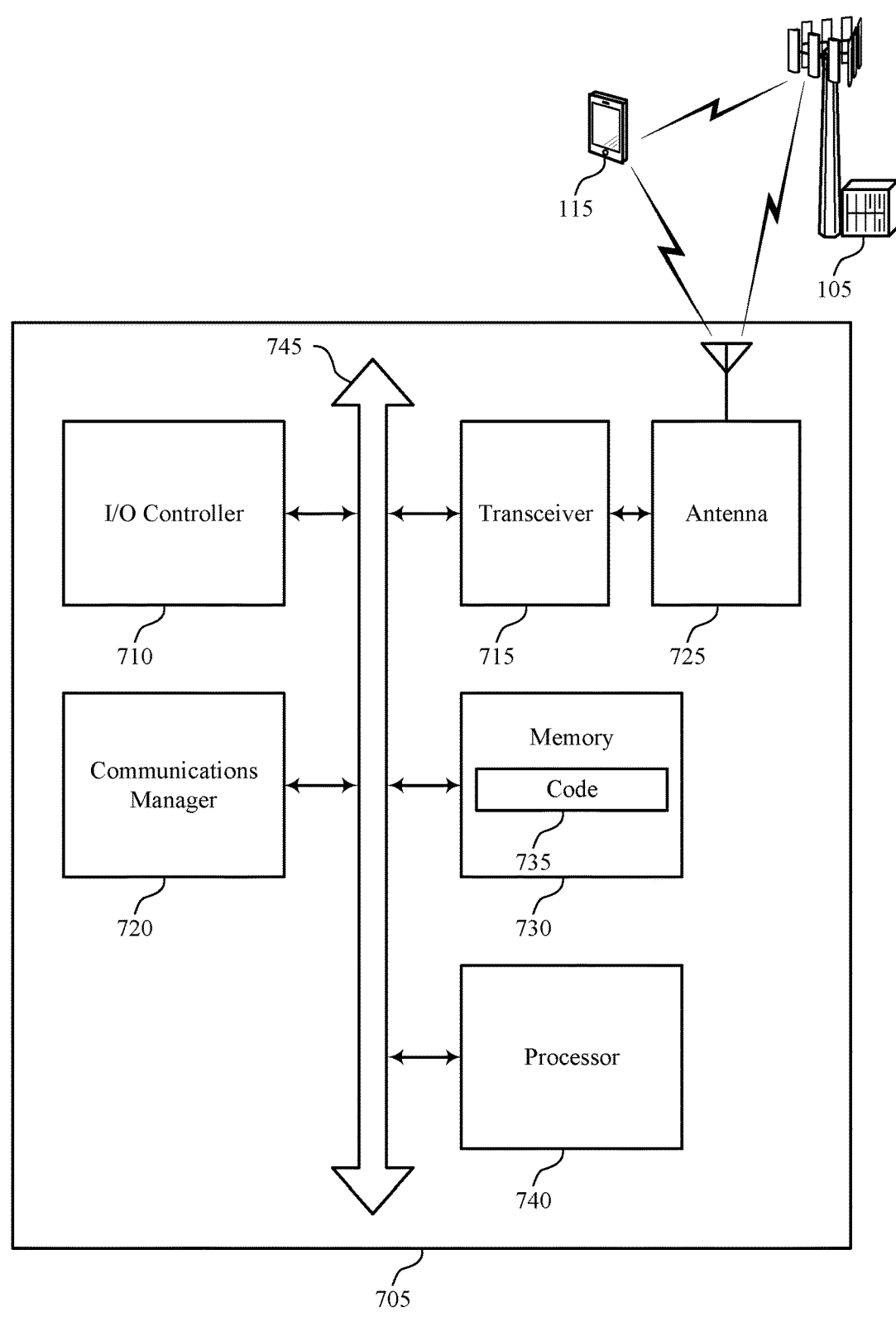
FIG. 7 shows a diagram of a system including a UE that supports pausing and resuming skipping of control channel monitoring in accordance with one or more aspects of the present disclosure.

FIG. 7 shows a diagram of a system 700 including a device 705 that supports pausing and resuming skipping of control channel monitoring in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bidirectional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bidirectionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting pausing and resuming skipping of control channel monitoring). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communication in accordance with examples as disclosed herein. For example, the communications manager 720 is capable of, configured to, or operable to support a means for receiving, from a second wireless communication device, a first control message scheduling transmission of a message and indicating to skip monitoring of one or more control channel occasions during a time period. The communications manager 720 is capable of, configured to, or operable to support a means for transmitting a feedback message indicating that the message was not successfully received and that the first wireless communication device is resuming monitoring of at least one control channel occasion of the one or more control channel occasions during the time period. The communications manager 720 is capable of, configured to, or operable to support a means for monitoring, within the time period, a first control channel occasion of the at least one control channel occasion for a second control message scheduling retransmission of the message. The communications manager 720 is capable of, configured to, or operable to support a means for skipping monitoring of a remaining one or more control channel occasions within the time period subsequent to the first control channel occasion.

By including or configuring the communications manager 720 in accordance with examples as described herein, the device 705 may support techniques for improved communication reliability, reduced latency, improved user experience related to increased framerate, improved video quality, and improved video stability, reduced power consumption and longer battery life, more efficient utilization of communication resources, and improved coordination between devices by both pausing skipping of monitoring and resuming skipping of monitoring.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of pausing and resuming skipping of control channel monitoring as described herein, or the at least one processor 740 and the at least one memory 730 may be otherwise configured to, individually or collectively, perform or support such operations.

Figure 8:
FIG. 8 shows a diagram of a system including a network entity that supports pausing and resuming skipping of control channel monitoring in accordance with one or more aspects of the present disclosure.

FIG. 8 shows a diagram of a system 800 including a device 805 that supports pausing and resuming skipping of control channel monitoring in accordance with one or more aspects of the present disclosure. The device 805 may be an example of or include the components of a device 405, a device 505, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, at least one memory 825, code 830, and at least one processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or one or more memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or one or more memory components (e.g., the at least one processor 835, the at least one memory 825, or both), may be included in a chip or chip assembly that is installed in the device 805. In some examples, the transceiver 810 may be operable to support communications via one or more communications links (e.g., a communication link 125, a backhaul communication link 120, a midhaul communication link 162, a fronthaul communication link 168).

The at least one memory 825 may include RAM, ROM, or any combination thereof. The at least one memory 825 may store computer-readable, computer-executable code 830 including instructions that, when executed by one or more of the at least one processor 835, cause the device 805 to perform various functions described herein. The code 830 may be stored in a non-transitory computer-readable medium such as system memory or another type of memory. In some cases, the code 830 may not be directly executable by a processor of the at least one processor 835 but may cause a computer (e.g., when compiled and executed) to perform functions described herein. In some cases, the at least one memory 825 may contain, among other things, a BIOS which may control basic hardware or software operation such as the interaction with peripheral components or devices. In some examples, the at least one processor 835 may include multiple processors and the at least one memory 825 may include multiple memories. One or more of the multiple processors may be coupled with one or more of the multiple memories which may, individually or collectively, be configured to perform various functions herein (for example, as part of a processing system).

The at least one processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 835 may be configured to operate a memory array using a memory controller. In some other cases, a memory controller may be integrated into one or more of the at least one processor 835. The at least one processor 835 may be configured to execute computer-readable instructions stored in a memory (e.g., one or more of the at least one memory 825) to cause the device 805 to perform various functions (e.g., functions or tasks supporting pausing and resuming skipping of control channel monitoring). For example, the device 805 or a component of the device 805 may include at least one processor 835 and at least one memory 825 coupled with one or more of the at least one processor 835, the at least one processor 835 and the at least one memory 825 configured to perform various functions described herein. The at least one processor 835 may be an example of a cloud-computing platform (e.g., one or more physical nodes and supporting software such as operating systems, virtual machines, or container instances) that may host the functions (e.g., by executing code 830) to perform the functions of the device 805. The at least one processor 835 may be any one or more suitable processors capable of executing scripts or instructions of one or more software programs stored in the device 805 (such as within one or more of the at least one memory 825). In some implementations, the at least one processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the at least one processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the at least one memory 825, the code 830, and the at least one processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication in accordance with examples as disclosed herein. For example, the communications manager 820 is capable of, configured to, or operable to support a means for receiving, from a second wireless communication device, a first control message scheduling transmission of a message and indicating to skip monitoring of one or more control channel occasions during a time period. The communications manager 820 is capable of, configured to, or operable to support a means for transmitting a feedback message indicating that the message was not successfully received and that the first wireless communication device is resuming monitoring of at least one control channel occasion of the one or more control channel occasions during the time period. The communications manager 820 is capable of, configured to, or operable to support a means for monitoring, within the time period, a first control channel occasion of the at least one control channel occasion for a second control message scheduling retransmission of the message. The communications manager 820 is capable of, configured to, or operable to support a means for skipping monitoring of a remaining one or more control channel occasions within the time period subsequent to the first control channel occasion.

By including or configuring the communications manager 820 in accordance with examples as described herein, the device 805 may support techniques for improved communication reliability, reduced latency, improved user experience related to increased framerate, improved video quality, and improved video stability, reduced power consumption and longer battery life, more efficient utilization of communication resources, and improved coordination between devices by both pausing skipping of monitoring and resuming skipping of monitoring.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, one or more of the at least one processor 835, one or more of the at least one memory 825, the code 830, or any combination thereof (for example, by a processing system including at least a portion of the at least one processor 835, the at least one memory 825, the code 830, or any combination thereof). For example, the code 830 may include instructions executable by one or more of the at least one processor 835 to cause the device 805 to perform various aspects of pausing and resuming skipping of control channel monitoring as described herein, or the at least one processor 835 and the at least one memory 825 may be otherwise configured to, individually or collectively, perform or support such operations.

FIG. 9 shows a flowchart illustrating a method 900 that supports pausing and resuming skipping of control channel monitoring in accordance with aspects of the present disclosure. The operations of the method 900 may be implemented by a UE or a network entity or its components as described herein. For example, the operations of the method 900 may be performed by a UE 115 or a network entity as described with reference to FIGS. 1 through 8. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 905, the method may include receiving, from a second wireless communication device, a first control message scheduling transmission of a message and indicating to skip monitoring of one or more control channel occasions during a time period. The operations of block 905 may be performed in accordance with examples as disclosed herein. In some examples, aspects of the operations of 905 may be performed by a control message component 625 as described with reference to FIG. 6.

At 910, the method may include transmitting a feedback message indicating that the message was not successfully received and that the first wireless communication device is resuming monitoring of at least one control channel occasion of the one or more control channel occasions during the time period. The operations of block 910 may be performed in accordance with examples as disclosed herein. In some examples, aspects of the operations of 910 may be performed by a feedback component 630 as described with reference to FIG. 6.

At 915, the method may include monitoring, within the time period, a first control channel occasion of the at least one control channel occasion for a second control message scheduling retransmission of the message. The operations of block 915 may be performed in accordance with examples as disclosed herein. In some examples, aspects of the operations of 915 may be performed by a monitoring component 635 as described with reference to FIG. 6.

At 920, the method may include skipping monitoring of a remaining one or more control channel occasions within the time period subsequent to the first control channel occasion. The operations of block 920 may be performed in accordance with examples as disclosed herein. In some examples, aspects of the operations of 920 may be performed by a monitoring component 635 as described with reference to FIG. 6.

FIG. 10 shows a flowchart illustrating a method 1000 that supports pausing and resuming skipping of control channel monitoring in accordance with aspects of the present disclosure. The operations of the method 1000 may be implemented by a UE or a network entity or its components as described herein. For example, the operations of the method 1000 may be performed by a UE 115 or a network entity as described with reference to FIGS. 1 through 8. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include receiving, from a second wireless communication device, a first control message scheduling transmission of a message and indicating to skip monitoring of one or more control channel occasions during a time period. The operations of block 1005 may be performed in accordance with examples as disclosed herein. In some examples, aspects of the operations of 1005 may be performed by a control message component 625 as described with reference to FIG. 6.

At 1010, the method may include transmitting a feedback message indicating that the message was not successfully received and that the first wireless communication device is resuming monitoring of at least one control channel occasion of the one or more control channel occasions during the time period. The operations of block 1010 may be performed in accordance with examples as disclosed herein. In some examples, aspects of the operations of 1010 may be performed by a feedback component 630 as described with reference to FIG. 6.

At 1015, the method may include monitoring, within the time period, a first control channel occasion of the at least one control channel occasion for a second control message scheduling retransmission of the message. The operations of block 1015 may be performed in accordance with examples as disclosed herein. In some examples, aspects of the operations of 1015 may be performed by a monitoring component 635 as described with reference to FIG. 6.

At 1020, the method may include receiving, from the second wireless communication device via the first control channel occasion, the second control message scheduling retransmission of the message. The operations of block 1020 may be performed in accordance with examples as disclosed herein. In some examples, aspects of the operations of 1020 may be performed by a control message component 625 as described with reference to FIG. 6.

At 1025, the method may include receiving, from the second wireless communication device, a retransmission of the message based on the second control message. The operations of block 1025 may be performed in accordance with examples as disclosed herein. In some examples, aspects of the operations of 1025 may be performed by a message component 640 as described with reference to FIG. 6.

At 1030, the method may include transmitting a second feedback message indicating that the retransmission of the message was successfully received and that the first wireless communication device is skipping monitoring of the remaining one or more control channel occasions within the time period. The operations of block 1030 may be performed in accordance with examples as disclosed herein. In some examples, aspects of the operations of 1030 may be performed by a feedback component 630 as described with reference to FIG. 6.

At 1035, the method may include skipping monitoring of a remaining one or more control channel occasions within the time period subsequent to the first control channel occasion based on successfully receiving the retransmission of the message. The operations of block 1035 may be performed in accordance with examples as disclosed herein. In some examples, aspects of the operations of 1035 may be performed by a monitoring component 635 as described with reference to FIG. 6.

The following provides an overview of aspects of the present disclosure:

Aspect 1: A method for wireless communication by a first wireless communication device, comprising: receiving, from a second wireless communication device, a first control message scheduling transmission of a message and indicating to skip monitoring of one or more control channel occasions during a time period; transmitting a feedback message indicating that the message was not successfully received and that the first wireless communication device is resuming monitoring of at least one control channel occasion of the one or more control channel occasions during the time period; monitoring, within the time period, a first control channel occasion of the at least one control channel occasion for a second control message scheduling retransmission of the message; and skipping monitoring of a remaining one or more control channel occasions within the time period subsequent to the first control channel occasion.

Aspect 2: The method of aspect 1, further comprising: receiving, from the second wireless communication device via the first control channel occasion, the second control message scheduling retransmission of the message; and receiving, from the second wireless communication device, a retransmission of the message based at least in part on the second control message, wherein skipping monitoring of the remaining one or more control channel occasions is based at least in part on successfully receiving the retransmission of the message.

Aspect 3: The method of aspect 2, further comprising: transmitting a second feedback message indicating that the retransmission of the message was successfully received and that the first wireless communication device is skipping monitoring of the remaining one or more control channel occasions within the time period.

Aspect 4: The method of any of aspects 1 through 3, wherein skipping monitoring of the remaining one or more control channel occasions within the time period is based at least in part on a quantity of attempted retransmissions of the message satisfying a threshold quantity of retransmissions.

Aspect 5: The method of any of aspects 1 through 4, wherein skipping monitoring of the remaining one or more control channel occasions within the time period is based at least in part on a quantity of feedback messages transmitted by the first wireless communication device within the time period.

Aspect 6: The method of any of aspects 1 through 5, wherein the second control message is a first type of control message, the method further comprising: refraining from monitoring the at least one control channel occasion for a second type of control message that is different from the first type of control message.

Aspect 7: The method of any of aspects 1 through 6, further comprising: skipping monitoring of a following one or more control channel occasions within a second time period subsequent to the time period.

Aspect 8: The method of any of aspects 1 through 7, wherein the one or more control channel occasions comprise one or more PDCCH occasions.

Aspect 9: The method of any of aspects 1 through 8, wherein the feedback message comprises a NACK message of a HARQ process.

Aspect 10: A first wireless communication device for wireless communication, comprising one or more memories storing processor-executable code, and one or more processors coupled with the one or more memories and individually or collectively operable to execute the code to cause the first wireless communication device to perform a method of any of aspects 1 through 9.

Aspect 11: A first wireless communication device for wireless communication, comprising at least one means for performing a method of any of aspects 1 through 9.

Aspect 12: A non-transitory computer-readable medium storing code for wireless communication, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless communication device, comprising:
one or more memories storing processor-executable code; and
one or more processors coupled with the one or more memories and individually or collectively operable to execute the code to cause the first wireless communication device to:
receive, from a second wireless communication device, a first control message scheduling transmission of a message and indicating to skip monitoring of one or more control channel occasions during a time period;
skip monitoring of a first control channel occasion of a first at least one control channel occasion of the one or more control channel occasions during the time period;
transmit a feedback message indicating that the message was not successfully received and that the first wireless communication device is resuming monitoring of a second at least one control channel occasion of the one or more control channel occasions during the time period;
monitor, within the time period, a second control channel occasion of the second at least one control channel occasion subsequent to the first control channel occasion for a second control message scheduling retransmission of the message; and skip monitoring of a remaining one or more control channel occasions within the time period subsequent to the second control channel occasion based at least in part on the monitoring of the first control channel occasion being skipped and the second control channel occasion being monitored.

2. The first wireless communication device of claim 1, wherein the one or more processors are individually or collectively further operable to execute the code to cause the first wireless communication device to:

receive, from the second wireless communication device via the second control channel occasion, the second control message scheduling retransmission of the message; and receive, from the second wireless communication device, a retransmission of the message based at least in part on the second control message, wherein skipping monitoring of the remaining one or more control channel occasions is based at least in part on successfully receiving the retransmission of the message.

3. The first wireless communication device of claim 2, wherein the one or more processors are individually or collectively further operable to execute the code to cause the first wireless communication device to:

transmit a second feedback message indicating that the retransmission of the message was successfully received and that the first wireless communication device is skipping monitoring of the remaining one or more control channel occasions within the time period.

4. The first wireless communication device of claim 1, wherein skipping monitoring of the remaining one or more control channel occasions within the time period is based at least in part on a quantity of attempted retransmissions of the message satisfying a threshold quantity of retransmissions.

5. The first wireless communication device of claim 1, wherein skipping monitoring of the remaining one or more control channel occasions within the time period is based at least in part on a quantity of feedback messages transmitted by the first wireless communication device within the time period.

6. The first wireless communication device of claim 1, wherein the second control message is a first type of control message, and the one or more processors are individually or collectively further operable to execute the code to cause the first wireless communication device to:

refrain from monitoring the second at least one control channel occasion for a second type of control message that is different from the first type of control message.

7. The first wireless communication device of claim 1, wherein the one or more processors are individually or collectively further operable to execute the code to cause the first wireless communication device to:

skip monitoring of a following one or more control channel occasions within a second time period subsequent to the time period.

8. The first wireless communication device of claim 1, wherein the one or more control channel occasions comprise one or more physical downlink control channel (PDCCH) occasions.

9. The first wireless communication device of claim 1, wherein the feedback message comprises a negative acknowledge (NACK) message of a hybrid automatic repeat request (HARQ) process.

10. A method for wireless communication by a first wireless communication device, comprising:

receiving, from a second wireless communication device, a first control message scheduling transmission of a message and indicating to skip monitoring of one or more control channel occasions during a time period;

skipping monitoring of a first control channel occasion of a first at least one control channel occasion of the one or more control channel occasions during the time period;

transmitting a feedback message indicating that the message was not successfully received and that the first wireless communication device is resuming monitoring of a second at least one control channel occasion of the one or more control channel occasions during the time period;

monitoring, within the time period, a second control channel occasion of the second at least one control channel occasion subsequent to the first control channel occasion for a second control message scheduling retransmission of the message; and skipping monitoring of a remaining one or more control channel occasions within the time period subsequent to the second control channel occasion based at least in part on the monitoring of the first control channel occasion being skipped and the second control channel occasion being monitored.

11. The method of claim 10, further comprising:

receiving, from the second wireless communication device via the second control channel occasion, the second control message scheduling retransmission of the message; and receiving, from the second wireless communication device, a retransmission of the message based at least in part on the second control message, wherein skipping monitoring of the remaining one or more control channel occasions is based at least in part on successfully receiving the retransmission of the message.

12. The method of claim 11, further comprising:

transmitting a second feedback message indicating that the retransmission of the message was successfully received and that the first wireless communication device is skipping monitoring of the remaining one or more control channel occasions within the time period.

13. The method of claim 10, wherein skipping monitoring of the remaining one or more control channel occasions within the time period is based at least in part on a quantity of attempted retransmissions of the message satisfying a threshold quantity of retransmissions.

14. The method of claim 10, wherein skipping monitoring of the remaining one or more control channel occasions within the time period is based at least in part on a quantity of feedback messages transmitted by the first wireless communication device within the time period.

15. The method of claim 10, wherein the second control message is a first type of control message, the method further comprising:

refraining from monitoring the second at least one control channel occasion for a second type of control message that is different from the first type of control message.

16. The method of claim 10, further comprising:

skipping monitoring of a following one or more control channel occasions within a second time period subsequent to the time period.

17. The method of claim 10, wherein the one or more control channel occasions comprise one or more physical downlink control channel (PDCCH) occasions.

18. The method of claim 10, wherein the feedback message comprises a negative acknowledge (NACK) message of a hybrid automatic repeat request (HARQ) process.

19. A non-transitory computer-readable medium storing code for wireless communication by a first wireless communication device, the code comprising instructions executable by one or more processors to:

receive, from a second wireless communication device, a first control message scheduling transmission of a message and indicating to skip monitoring of one or more control channel occasions during a time period;

skip monitoring of a first control channel occasion of a first at least one control channel occasion of the one or more control channel occasions during the time period;

transmit a feedback message indicating that the message was not successfully received and that the first wireless communication device is resuming monitoring of a second at least one control channel occasion of the one or more control channel occasions during the time period;

monitor, within the time period, a second control channel occasion of the second at least one control channel occasion subsequent to the first control channel occasion for a second control message scheduling retransmission of the message; and skip monitoring of a remaining one or more control channel occasions within the time period subsequent to the second control channel occasion based at least in part on the monitoring of the first control channel occasion being skipped and the second control channel occasion being monitored.

20. The non-transitory computer-readable medium of claim 19, wherein the instructions are further executable by the one or more processors to:

receive, from the second wireless communication device via the second control channel occasion, the second control message scheduling retransmission of the message; and receive, from the second wireless communication device, a retransmission of the message based at least in part on the second control message, wherein skipping monitoring of the remaining one or more control channel occasions is based at least in part on successfully receiving the retransmission of the message.

21. The non-transitory computer-readable medium of claim 20, wherein the instructions are further executable by the one or more processors to:

transmit a second feedback message indicating that the retransmission of the message was successfully received and that the first wireless communication device is skipping monitoring of the remaining one or more control channel occasions within the time period.

22. The non-transitory computer-readable medium of claim 19, wherein skipping monitoring of the remaining one or more control channel occasions within the time period is based at least in part on a quantity of attempted retransmissions of the message satisfying a threshold quantity of retransmissions.

23. The non-transitory computer-readable medium of claim 19, wherein skipping monitoring of the remaining one or more control channel occasions within the time period is based at least in part on a quantity of feedback messages transmitted by the first wireless communication device within the time period.

24. The non-transitory computer-readable medium of claim 19, wherein the second control message is a first type of control message, and the instructions are further executable by the one or more processors to:

refrain from monitoring the second at least one control channel occasion for a second type of control message that is different from the first type of control message.

25. The non-transitory computer-readable medium of claim 19, wherein the instructions are further executable by the one or more processors to:

skip monitoring of a following one or more control channel occasions within a second time period subsequent to the time period.

26. The non-transitory computer-readable medium of claim 19, wherein the one or more control channel occasions comprise one or more physical downlink control channel (PDCCH) occasions.

27. The non-transitory computer-readable medium of claim 19, wherein the feedback message comprises a negative acknowledge (NACK) message of a hybrid automatic repeat request (HARQ) process.

28. A first wireless communication device for wireless communication, comprising:

means for receiving, from a second wireless communication device, a first control message scheduling transmission of a message and indicating to skip monitoring of one or more control channel occasions during a time period;

means for skipping monitoring of a first control channel occasion of a first at least one control channel occasion of the one or more control channel occasions during the time period;

means for transmitting a feedback message indicating that the message was not successfully received and that the first wireless communication device is resuming monitoring of a second at least one control channel occasion of the one or more control channel occasions during the time period;

means for monitoring, within the time period, a second control channel occasion of the second at least one control channel occasion subsequent to the first control channel occasion for a second control message scheduling retransmission of the message; and means for skipping monitoring of a remaining one or more control channel occasions within the time period subsequent to the second control channel occasion based at least in part on the monitoring of the first control channel occasion being skipped and the second control channel occasion being monitored.

29. The first wireless communication device of claim 28, further comprising:

means for receiving, from the second wireless communication device via the second control channel occasion, the second control message scheduling retransmission of the message; and means for receiving, from the second wireless communication device, a retransmission of the message based at least in part on the second control message, wherein skipping monitoring of the remaining one or more control channel occasions is based at least in part on successfully receiving the retransmission of the message.

30. The first wireless communication device of claim 29, further comprising:

means for transmitting a second feedback message indicating that the retransmission of the message was successfully received and that the first wireless communication device is skipping monitoring of the remaining one or more control channel occasions within the time period.

* * * * *